United States Patent [19]

Pratt et al.

[11] Patent Number: 5,008,821
[45] Date of Patent: Apr. 16, 1991

[54] COMPUTERIZED PROCESS AND SYSTEM FOR ASSIGNING AND DELIVERING FEED TO ANIMALS IN A FEEDLOT

[75] Inventors: William C. Pratt, Canyon; William D. McKillip, Amarillo, both of Tex.

[73] Assignee: Micro Chemical, Inc., Amarillo, Tex.

[21] Appl. No.: 148,685

[22] Filed: Jan. 26, 1988

Related U.S. Application Data

[63] Continuation-in-part of Ser. No. 85,073, Aug. 12, 1987.

[51] Int. Cl.$^5$ ................................................. A01K 5/02
[52] U.S. Cl. .............................. 364/413.01; 119/51.02; 119/51.01
[58] Field of Search ........................ 364/413, 413.01; 119/51 R

[56] References Cited

U.S. PATENT DOCUMENTS

| | | | |
|---|---|---|---|
| 3,942,157 | 3/1976 | Azure | 364/90 D |
| 4,049,950 | 9/1977 | Byrne | 119/51 R |
| 4,510,495 | 4/1985 | Sigrimis | 119/51 R |
| 4,569,421 | 2/1986 | Sandstedt | 364/401 |
| 4,712,511 | 12/1987 | Zamzow | 119/51 R |

*Primary Examiner*—Jerry Smith
*Assistant Examiner*—Gail O. Hayes
*Attorney, Agent, or Firm*—Klarquist, Sparkman, Campbell, Leigh & Whinston

[57] ABSTRACT

The system includes a portable computer for recording assignment data for each cattle pen and a host computer that stores feed consumption data for each of the plurality of cattle pens in the feedlot. The portable computer includes means for entering data such as a keyboard or other machine that enables a driver reading the feed bunks to identify each cattle pen and enter the assignment data as he views the feed bunks. The cattle pens may be identified by a conventional alphanumeric symbol or may have automated means such as an RF signal from a transmitter or a bar code that can be read from the truck cab. The driver has the option of reviewing the feed consumption data on the computer screen as he makes a feed assignment. The assignment data is used by the host computer to update its feed consumption data and to generate feed delivery data for feed trucks. This data may include a ration number and ration quantity for each cattle pen as well as a feeding route for each feed truck. During the feed delivery, the dispensing of the ration quantity at each feed bunk is monitored by a portable computer to check if the cattle pen is receiving the correct ration number and ration quantity. The portable computer is also adpated to record for each cattle pen the actual feed dispensed into its feed bunk for comparison against the desired ration quantity.

23 Claims, 6 Drawing Sheets

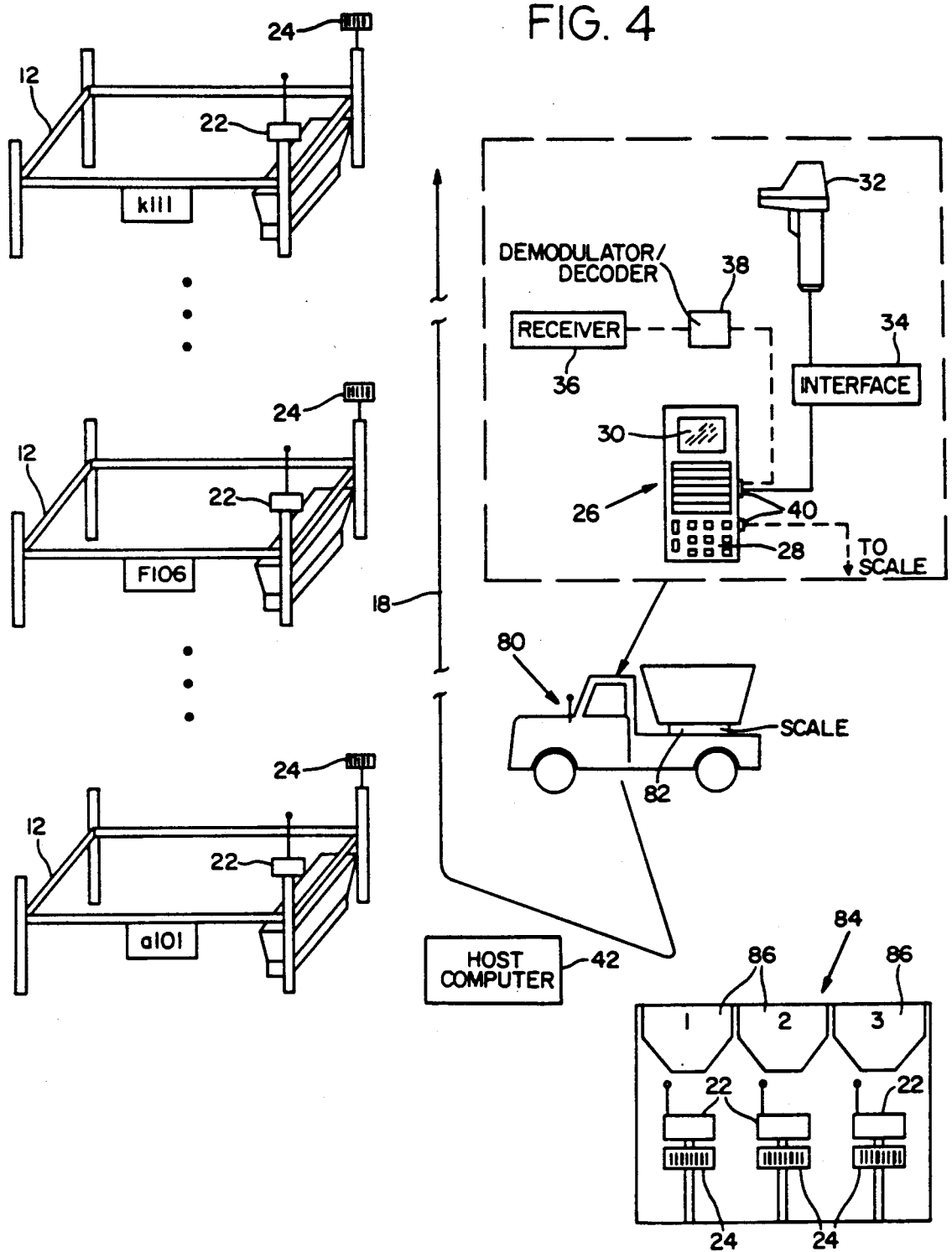

COMPUTERIZED PROCESS AND SYSTEM FOR ASSIGNING AND DELIVERING FEED TO ANIMALS IN A FEEDLOT

RELATED APPLICATION DATA

This application is a continuation-in-part of U.S. patent application Ser. No. 07/085,073, filed Aug. 12, 1987. This application incorporates herein by reference the complete disclosure of the parent application.

BACKGROUND OF THE INVENTION

This invention relates generally to processes and systems for feeding animals in a feedlot, and more particularly, to a computerized process and system for assigning and delivering feed to each of a plurality of feed bunks in a feedlot.

Feedlots generally feed thousands of head of cattle or other animals at various stages of growth. Cattle within a feedlot are physically contained in cattle pens, each pen typically having a feed bunk to receive feed. Ownership of particular cattle in the feedlot is defined by a unique lot number. The number of cattle in an owner's lot can vary and may occupy a fraction of or one or more cattle pens. Within a particular pen, cattle are fed the same feed ration, i.e., the same type of ration and ration quantity. A feedlot thus generally comprises a large number of pens to accommodate cattle at various growth stages or cattle that require special feeding because they are sick, undernourished, etc.

Feeding animals in a large feedlot is a complex and time-consuming task because of the large number of ration quantities to be determined each day and delivered to each pen for deposit in an associated feed bunk. Generally, feeding cattle in a feedlot is a two-step process that may be followed once or more a day. First, the feed bunk of each pen must be checked to determine the ration quantity to be fed to the cattle therein at the next feeding. Second, feed trucks loaded with the appropriate ration quantities are driven to the feed bunks and the ration quantity for each is dispensed.

The first step is known as "reading" the bunks to determine the feed assignments. The person reading the bunks drives past all the active cattle pens in the feedlot in a pickup truck or other high profile vehicle and visually estimates the amount of feed left in each bunk from the prior feeding. The amount of feed then assigned depends on several factors, including the number of cattle in the pen, type of ration desired, the amount of feed remaining from a prior feeding, weather, consumption trends, ration changes, etc. Information on these factors, if available to the person, is written on a "yard sheet" carried in the truck that also includes the pen number and lot number of the cattle being fed. From what the driver sees in each bunk and from reviewing the consumption history on the yard sheet, he notes on a separate "feed card" whether the ration quantity should be changed, along with the lot number, ration number, and pen number. The feed cards are then gathered back at a central office to determine the loading of various feed trucks and the assignment of pens to be serviced by the trucks.

The present system of reading feed bunks for assigning feed is slow, inaccurate, and subject to error in entering data. The person reading the bunks attempts to drive close enough to each bunk to see the feed, often before the sun has risen or in dim early morning light. Without stopping the vehicle, the driver must read the pen number, review the yard sheet, and write down feed assignments for the pen on a feed card. Once all the assignment data on the feed cards is gathered together, considerable time is then spent matching rations numbers and ration quantities with pen numbers, and determining the feed truck routing for delivering the feed as quickly as possible to the bunks. Loads are assigned to a truck according to the ration number, pounds of feed to make a full truck, and the route to be followed in delivering to the pens. This portion of the first step is done manually and takes from 15 minutes to 2 hours, depending upon the size of the feedlot. Moreover, often no yard sheet is accessible at the pens and the feed assignments are made without the advantage of this information.

The second step of the process is delivery of feed to the appropriate pens. From the data gathered on the feed cards, a pen ticket is prepared for each of the cattle pens which bears the desired ration quantity. The ration quantities for a number of pens are then weighed and placed in a feed truck for delivery to the feed bunks. Each feed truck typically carries only one type of ration and has a scale for weighing quantities loaded or discharged from the truck, and a conveyor for conveying feed into the bunks. At the feed bunk of a cattle pen, the operator discharges the appropriate ration quantity by noting the desired loss of weight of ration from the truck on its scale. At the beginning and end of the weighing, the operator inserts the ticket into the scale to record the beginning and ending weights. From these weights the amount actually discharged can be determined. These tickets are then taken to the central office at the end of the route and the information manually entered into an accounting system to charge the feed cost to each cattle lot owner.

This feeding step, like the reading of the feed bunks, is labor intensive and time-consuming. The feed truck route and feed rations must all be calculated by hand from the information on the feed cards. Transferring data from pen tickets to the accounting system is also subject to error. Moreover, there is nothing in the present system to actively warn the feed truck operator if he is dispensing the wrong ration type or ration quantity in a cattle pen.

SUMMARY OF THE INVENTION

Therefore, an object of the invention is to provide an improved process and system for assigning feed to feed bunks in a feedlot.

Another object of the invention is to provide such a process and system that allow the user to quickly review up-to-date yard sheet data as he makes the feed assignment.

Yet another object of the invention is to provide such a process and system in which assignment data is entered by keyboard, scanner, or other labor-saving device that avoids the need for handwritten notes or feed cards.

Still another object of the invention is to provide such a process and system that organize a feeding route for feed trucks from the assignment data entered.

Yet another object of the invention is to provide a reed delivery process and system that efficiently track the feed to be delivered to each feed bunk in the feedlot.

Still another object of the invention is to provide such a feed delivery process and system in which the type of feed ration and its quantity can be verified for a feed bunk before discharge into the bunk.

To achieve these objects, a process and system for assigning feed to feed bunks in a feedlot includes a computer for recording and storing feed consumption data for each of a plurality of cattle pens in the feedlot. Providing feed assignment data for the computer is a data entry means accessible at each feed bunk, such as the keyboard of a portable computer. Through the keyboard, the driver can communicate with the computer to review the feed consumption data while entering feed assignment data and can transfer to the computer the assignment data entered after the driver completes the bunk reading. The computer is adapted to store the assignment data for updating the feed consumption data for each of the feed bunks.

In the present embodiment, the computer comprises a host computer for storing the feed consumption data and a portable computer associated with the data entry means for recording the assignment data entered. The portable computer is adapted to receive the feed consumption data prior to the reading of the bunks and to transfer the recorded assignment data to the host computer after completion of the route.

The cattle pens in the feedlot may include automated identification means such as an RF transmitter or a bar code. These means can be quickly and accurately read by a corresponding machine such as an RF receiver or bar code scanner associated with the data entry means. By use of such a machine, errors in matching pens to assignment data are prevented.

A process and system for delivering feed rations to the feed bunks are also disclosed. The computer is adapted to provide feed delivery data, based on the assignment data, that indicates the type of feed ration and ration quantity for each of the cattle pens that have been read. Feed trucks are then filled and follow routes provided by the computer to dispense the feed. Each feed truck includes a scale which can be read by the computer through data entry means to determine the actual feed dispensed in each feed bunk and to monitor the ration quantity as it is being dispensed. The computer can also check against possible incorrect dispensing of a ration or alert the truck operator to a withdrawal problem.

The foregoing and other objects, features, and advantages of the invention will become more apparent from the following detailed description of a preferred embodiment which proceeds with reference to the accompanying drawings.

FIG. 4 is a schematic diagram of a system for delivering feed to each feed bunk according to the invention.

DETAILED DESCRIPTION

The Bunk Reader Process and System

Figure 1:
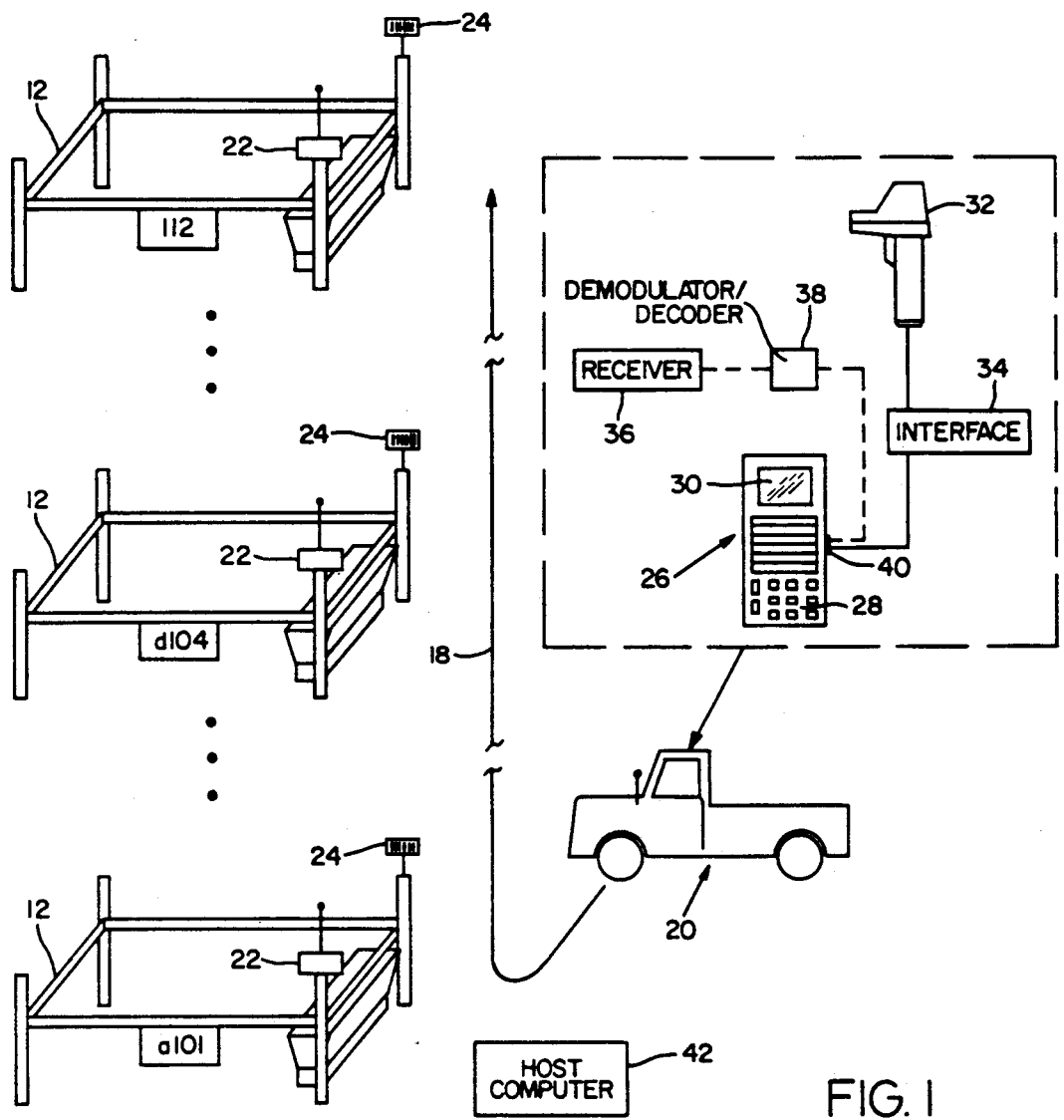
FIG. 1 is a schematic diagram of a system for assigning feed to each feed bunk according to the invention.

Referring now to FIG. 1 of the drawings, there is shown several cattle pens 12 in a feedlot, each having an associated feed bunk. A feed bunk holds a ration, i.e., a type of feed, in a selected quantity for the cattle contained within the pen. The arrow 18 represents a route that a truck 20 may take for the driver to view the condition of each feed bunk from the truck cab. That route, as will be described, depends on which cattle pens contain cattle and are thus currently receiving feed.

Each pen and associated feed bunk have means of identification such as an alphanumeric symbol (i.e., a101, d104, 112, etc.) mounted near the truck route that can be read by the person viewing the bunks. Alternatively, the identification may be through automated means such as an RF signal transmitted locally by a transmitter 22 or a bar code 24 affixed to the cattle pen. Such means provide an accurate identification of the pen without the driver having to attempt a written entry onto a feed card.

To "read" the bunks, i.e., identify the bunks and assignment data regarding feed rations, the driver carries in the cab a portable computer 26 such as a PDT111 manufactured by the MSI Data Corporation. The computer 26 includes a data entry means such as a keyboard 28 for entering feed assignment data and a display screen 30 for optimally viewing yard sheet data while making a feed assignment. If the cattle pens include automated identification means such as the transmitter 22 or bar code 24, a corresponding data entry means such as a machine capable of reading the identification signal is coupled to the computer 26. For reading the bar codes 24, a bar code scanner 32, such as the SYMBOLTEC LS8100 available from the MSI Corporation, is connected to the computer 26 via a conventional laser interface module 34. For reading the RF signals generated by transmitters 22, a conventional RF receiver 36 may be connected to the computer 26 via a conventional demodulator/decoder module 38. Whichever of the scanner 32 or receiver 36 is utilized, the machine is coupled to one of the computer's serial I/O port 40. Alternative means of automatic cattle pen identification may include Loran-type radio frequency triangulation, sound waves, etc.

Figure 2:
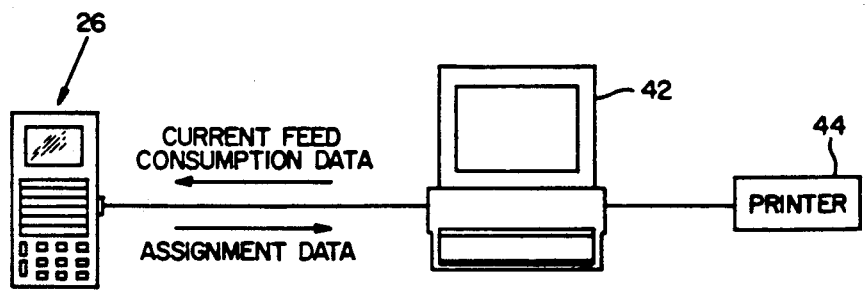
FIG. 2 is a schematic view showing data transfer between the portable and host computer of FIG. 1.

The portable computer 26 is adapted to receive the feed consumption data before a reading of the feed bunks so that the driver may review that data while entering assignment data. The portable computer 26 is also adapted to communicate with a host computer 42 for transferring the assignment data to it after all the feed bunks have been read. The movement of data between computers is illustrated in FIG. 2. The assignment data is utilized by the host computer to update its feed consumption data for each of the corresponding cattle pens. The feed consumption data includes consumption history for each pen, weather history (which affects feeding), physical condition of the feed bunk, which bunks should presently be read, and other data relevant to feeding. The assignment data may include a change in the ration quantity to be assigned and the present physical condition of the bunk, i.e., whether the bunk is completely empty, needs to be cleaned, whether the feed needs to be mixed with hay, or the time of feeding to be changed, etc.

The host computer 42 is normally located remote from the cattle pens because this computer is required for a number of additional feedlot operational and management tasks that require central access. It should be noted, however, that the portable computer 26 could be replaced by a "dumb" terminal and linked to the host computer continuously by radio signal instead of a physical connection. It should also be understood that the use of a host computer is not required for the invention. The feed consumption data could be stored and updated solely in the portable computer 26. This approach is usually not done because the feed consumption data is utilized for other purposes, such as management and invoicing, and must be made available for those purposes in a computer 42 located centrally in the feedlot.

The host computer 42 is programmed to utilize the newly entered assignment data for a number of tasks. One task is to determine the best or most efficient route for the truck 20 to read the selected feed bunks in the feedlot. As different cattle pens are emptied and filled with cattle, this data is entered in the host computer 42 to update the feed consumption data. The computer 42 calculates therefrom the best route through the cattle lot to read the currently used bunks. The route is transferred to the portable computer as part of the feed consumption data at the beginning of a bunk reading. At each pen during the route, pen numbers may be displayed on screen 30 after the previous bunk is read. The entered assignment data is also used to organize feed rations to be delivered to each feed bunk. This data is defined as feed delivery data and may be printed out for a feed truck operator by means of a printer 46 coupled to the computer 42 as shown in FIG. 2 and as will be described.

Figure 3A:
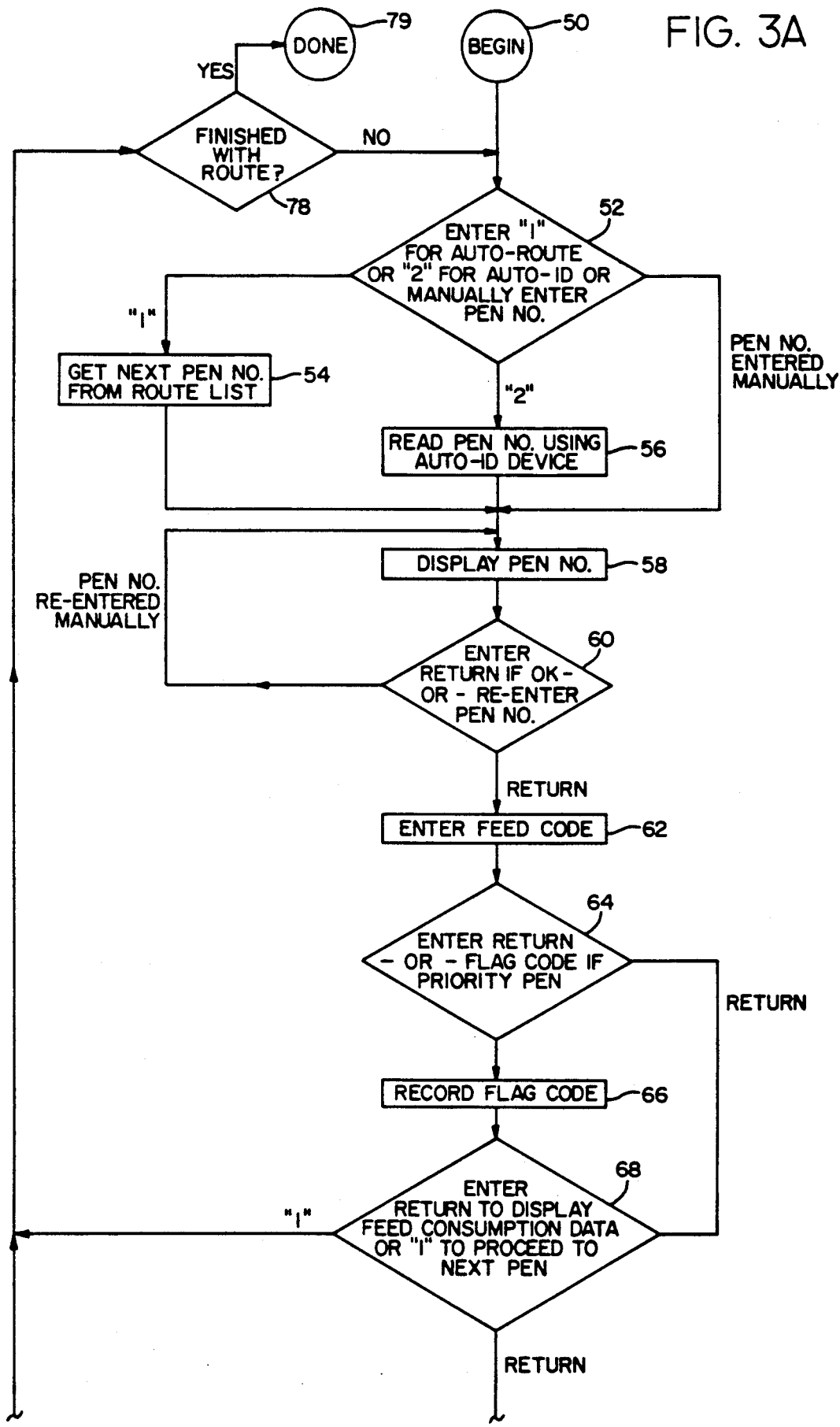
FIGS. 3A and 3B are a flowchart illustrating the computerized operation of the system of FIG. 1.
Figure 3B:
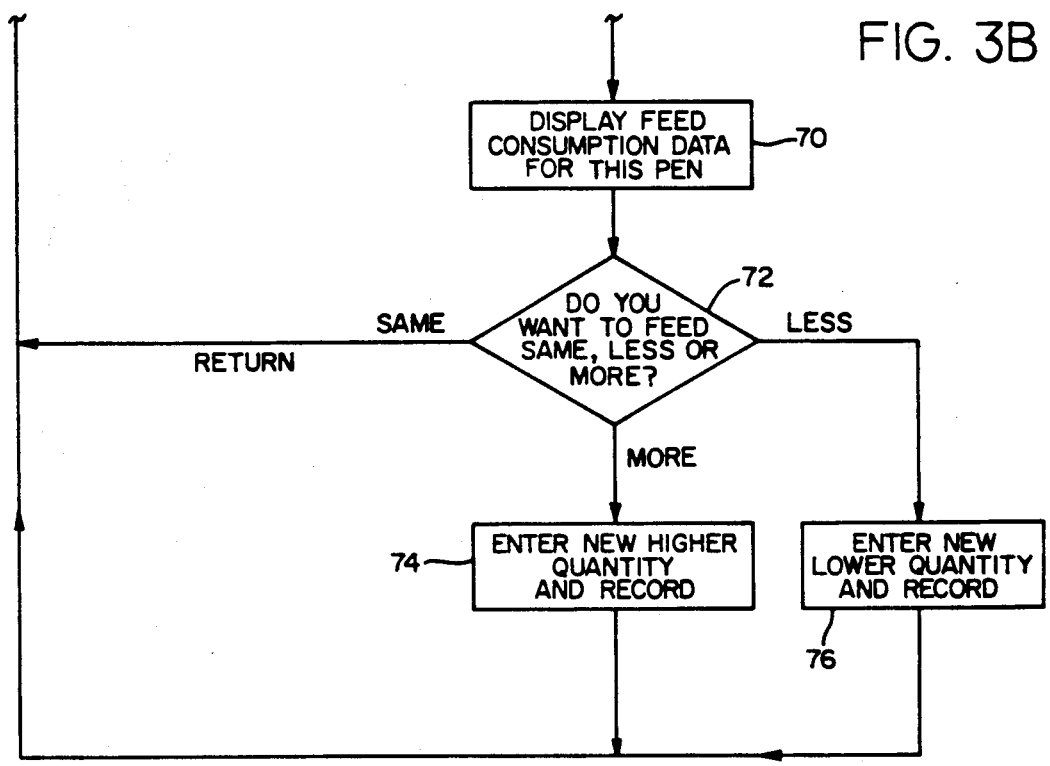

FIGS. 3A and 3B are a flowchart illustrating the computerized operation of the bunk reader system. For clarity, each step of the flowchart described herein is followed by a numeral in parenthesis corresponding to the flowchart steps in the figure. Prior to beginning a reading of the bunks, the feed consumption data is downloaded from the host computer 42 into the portable computer 26 and the computer 26 placed in the truck cab.

With the driver approaching a feed bunk, the program within the computer 26 is called (50). The driver is first prompted to enter a number to determine the identification means for the cattle pen (52). If he enters the number 1 in response, for example, the computer 26 displays an expected pen number from the bunk reader route list generated by the host computer 42 and contained within the feed consumption data transferred to the computer 26 (54). If the number 2 is entered, an automated identification means such as described is employed by the driver (56). The driver may also enter the pen number manually if desired. The pen number is then displayed for the driver to confirm its correctness (58). He confirms by entering a carriage return on the keyboard 28 or reenters the number if it is incorrect (60).

With the correct pen number confirmed, the driver is prompted to enter a feed code corresponding to a change in the ration quantity assigned to the pen's feed bunk (62). The code is simple: +1 is entered to increase the ration quantity; 0 is entered for no change in the ration quantity; and −1 is entered to decrease the ration quantity. These entries are later translated by the host computer 42 into a percentage change in the base amount of the ration quantity, e.g., 5%. Note that the driver need not identify the ration type explicitly. This identification is made by the host computer from the entered pen number.

At this point, the driver has the option of entering a flag code (64). Flag codes correspond to the physical condition of the bunk, feeding priority, feeding mix changes, or other actions to be taken while or before more feed is delivered (66). For example, if the driver notices a feed bunk is wiped clean or "slick," he enters a number code indicating that condition. If the bunk should be cleaned, another code number is entered. If hay should be mixed in with the next ration quantity, still another code number is entered, etc.

Once the feed code and flag codes, if desired, have been entered, the computer 26 prompts the driver on whether to display the historical feed consumption data for the pen (68). The driver typically evaluates this data only if the feeding of the cattle in the pen appears to be unusual. For example, a bunk that is slick several days in a row may indicate the base amount of feed is too small. Conversely, too much feed left over from a prior feeding may indicate the base amount is excessive. The consumption data indicates the actual ration quantities dispensed previously, as well as weather history that may affect prior feeding (70). The driver then has the option of changing the base amount of the next ration quantity (72) by entering a command. He may increase it (74), decrease it (76), or leave it unchanged. If the base amount of the ration quantity is to remain the unchanged, the driver simply enters a return on keyboard 28.

The computer 26 then checks to determine if the route is finished (78). If not, the driver is prompted to proceed to the next pen and the bunk reading continues. Once all feed bunks have been read, the driver is prompted to confirm that the bunk reading route is finished (79).

The Feed Delivery Process and System

The assignment data entered during the feed bunk reading is transferred to the host computer 42 for generating feed delivery data. This data, organized by ration type, is used for loading feed trucks and for organizing feed truck routes though the feed lot. An example of the delivery data produced by the host computer 42 for the feed trucks is shown in Table I below.

TABLE I

| FEED LOADOUT REPORT | |
|---|---|
| Pen | Pounds to Feed |
| * a101 | 500 |
| b102 | 1000 |
| c103 | 2000 |
| d104 | 1500 |
| e105 | 1300 |
| * F106 | 2000 |
| g107 | 3000 |
| h108 | 4000 |
| i109 | 3000 |
| j110 | 1500 |
| * k111 | 3000 |
| 112 | 3500 |
| m113 | 3500 |
| MAXIMUM LOAD SIZE = 6000 lbs. | |
| LOAD NO. 1 | |
| * a101 | 500 |
| * F106 | 2000 |
| * k111 | 3000 |
| Total | 5500 |
| LOAD NO. 2 | |
| b102 | 1000 |
| c103 | 2000 |
| d104 | 1500 |
| e105 | 1300 |
| Total | 5800 |

* denotes first priority to feed

Normally, each feed truck carries one type of feed ration and is filled with selected ration quantities to its maximum load. For example, in Table I above, the ration quantities for pen number a101, F106, and k111 have been combined in a single load of 5500 lbs., that is near the maximum load of 6000 lbs. for a feed truck. These quantities were determined from the amount of ration quantity for each pen plus whatever changes have been made to the base amount from prior readings of the feed bunks. Note also that the flag code for feeding priority was entered during the last bunk readings. The priority loads are thus combined by the computer 42 into the first load to be delivered to the cattle pens.

Referring now to FIG. 4, there is shown a drawing of a computerized feed delivery system. A feed truck 80 includes a weighing scale 82 for weighing the total load in the truck hopper and for weighing individually the ration quantities to be dispensed into each feed bunk. The scale is conventional and is adapted to provide an output signal indicating the weight of the load. Accompanying the truck operator is another portable computer 26 the same as or similar to the type used for bunk reading. It includes a keyboard 28, display screen 30, and one or more I/O ports 40. The computer 26 is adapted to connect to the scale 82 through an I/O port 40. As in the bunk reader system, the computer 26 may be associated with other data entry means such as an RF receiver 36 or bar code scanner 32. The feed bunks, of course, may include corresponding automated identification means such as RF transmitters 22 or bar code 24. FIG. 4 further shows a feed mill 84 from which feed is obtained for delivery to the feed bunks. The mill 84 has a number of ration bins 86 each holding a different type of ration and having means of identification such as an alphanumeric symbol, radio signal from a transmitter 22, or a bar code 24 affixed to the bin.

The type of feed ration and base amount of ration quantity for each cattle pen when initially filled with cattle is entered into host computer 42 by a feedlot supervisor. The ration quantities may be modified by the assignment data from the bunk readings. However, if the type of ration for the pen is changed or if drugs are added to the basic ration, this information is entered directly into the host computer. Certain drugs cannot be taken by cattle immediately before they are shipped from the feedlot for slaughter. One of the functions of the feed delivery system is to make certain that cattle ready for slaughter have drugs withdrawn from their feed rations in a timely manner, as will be shown.

Figure 5A:
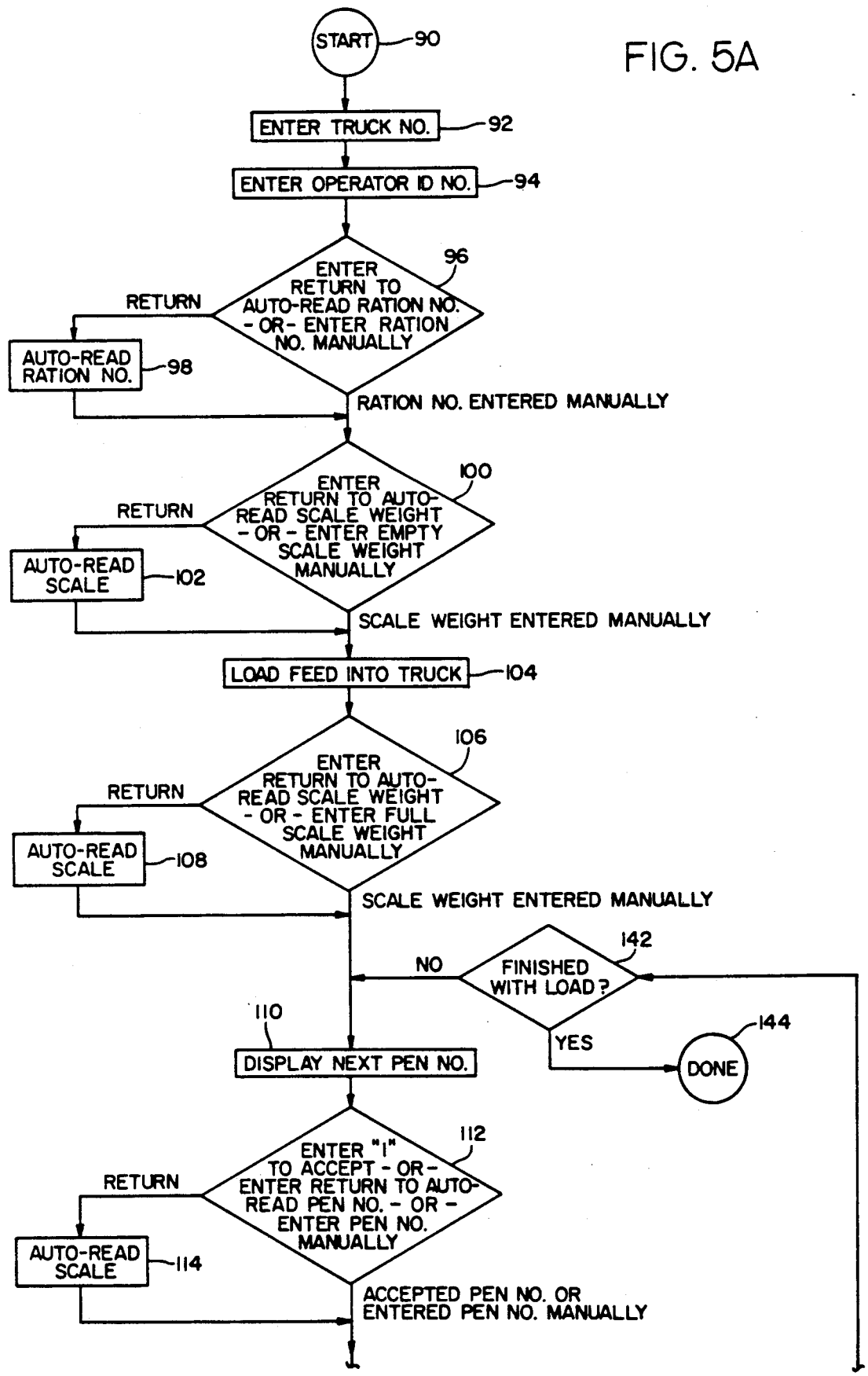
FIGS. 5A and 5B are a flowchart illustrating the computerized operation of the system of FIG. 4.
Figure 5B:
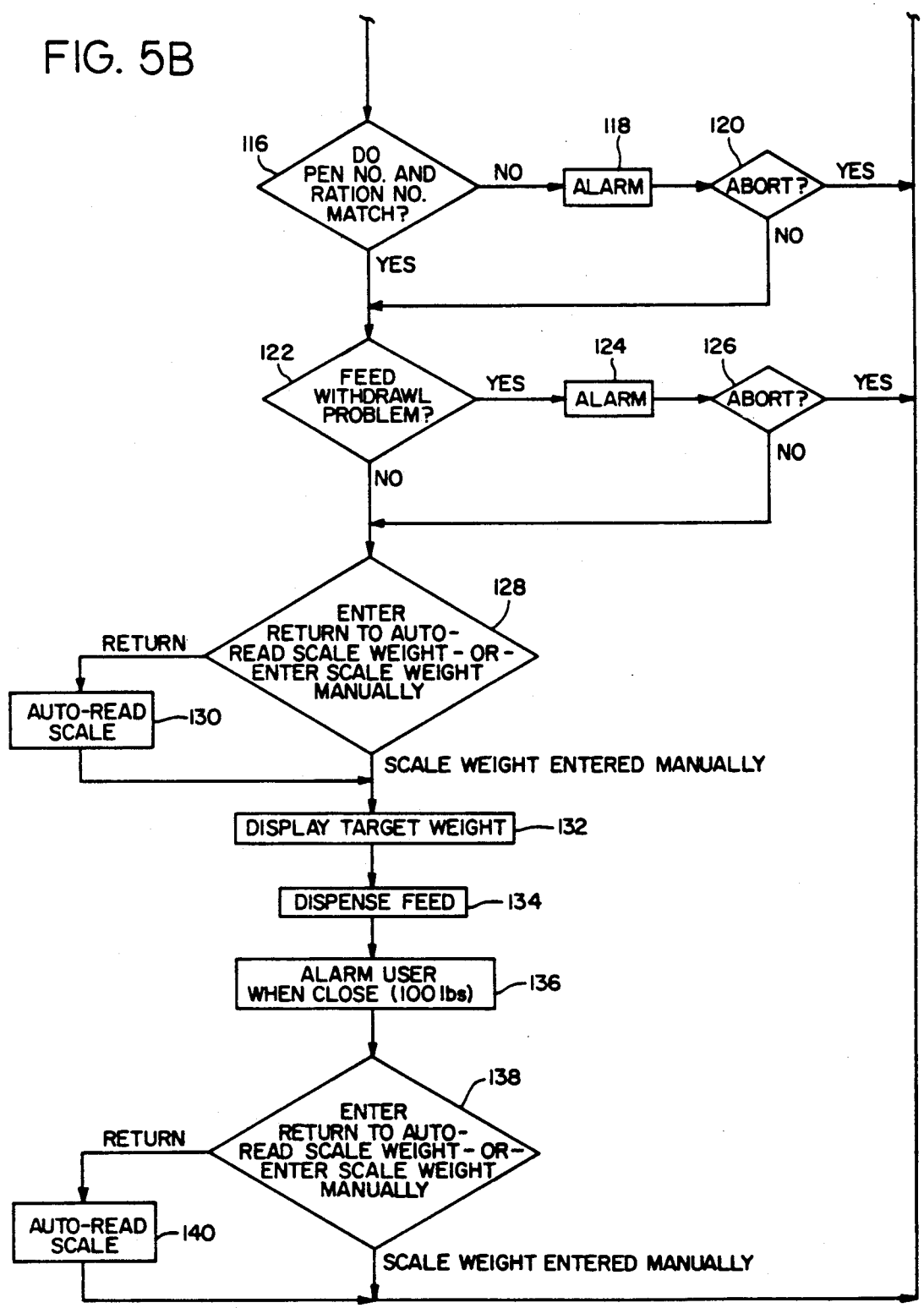

FIGS. 5A and 5B are a flowchart that illustrates the interactive programming of the computer 26 for directing the feed truck operator to deliver the appropriate ration and quantity to each pen. Initially, the host computer 42 has generated the feed delivery data for each pen from the assignment data received from the bunk reading. Prior to delivery, the feed delivery data shown in Table I is downloaded into the portable computer 26 via an I/O port 40. The present manner of transfer is the same as in FIG. 2, the difference being that in this step feed delivery data is transferred from the host computer 42 to the portable computer 26 prior to the delivery and feed dispensed data is transferred from the portable 26 to the host computer 42 after delivery.

The operator first proceeds to the mill 84 for loading the feed truck and calls the program (90). At the mill, he enters his feed delivery truck number and operator number (92, 94). If the operator is using an RF receiver 36 or bar code scanner 32 to identify the particular feed bin, he enters a return on the keyboard 28 to automatically read the identifying ration number, e.g., "2," on the bin (96, 98). Otherwise, the ration number is entered manually. The operator then connects the computer 26 through its I/O port 40 to the scale 82 and enters a return to record the empty scale weight (100, 102). That information may be entered manually as well (100). The operator proceeds to load the feed truck to the level specified in Table I, provided to him on a printout (104). The scale is again read to determine the total weight of feed loaded, either automatically (106, 108) or manually (106). At this point, the ration number and the total ration quantity loaded into the truck have been recorded in the computer 26, as well as the ration quantity or amount to be delivered to each pen in Table I.

The driver then proceeds to the first pen 12 whose number, a101, is retrieved from the route list produced by the host computer 42 and displayed on the display screen 30 (110). Upon arriving at the indicated pen, the driver identifies the pen using a machine (112, 114) or manually (112). The computer 26 in response compares the entered pen number against the pen numbers that are to receive that ration number to determine if the operator has driven to a correct pen (116). If the two numbers do not match, an alarm is given (118). The operator is then asked via the screen 30 if dispensing feed for that pen should be aborted (120). An affirmative answer aborts the feeding at the pen, and the screen 30 directs the driver to proceed to the next pen. The operator gives a negative answer to override and dispense the feed. The computer then determines if there is a feed withdrawal problem, as described (122). As before, an alarm is given if a potential problem exists (124) and the operator is given the chance to abort the pen feeding (126).

Immediately before the operator proceeds to dispensing the feed, the scale is again read manually or automatically (128, 130). The computer 26 then displays on the screen 30 the target weight for the truck operator (132). The operator dispenses feed (134), with the computer 26 monitoring the scale weight as the weight dispensed approaches the desired ration quantity for the feed bunk. The operator is notified by alarm or otherwise when the dispensed quantity is close to the desired quantity, such as within a hundred pounds (136). Once the ration quantity for the pen has been dispensed, the operator enters the remaining scale weight into the computer (138) to confirm the quantity. This entry can be made manually or automatically (140).

The program then checks to determine if the delivery route is finished (142). If not, the driver is prompted to proceed to the next pen and its number is displayed (110). The program continues until each pen on the route has received its ration quantity (144).

On returning to the host computer, the portable computer 26 is taken from the feed truck 80 and the data and actual feed dispensed is transferred from the computer 26 to the host computer 42. This data is used to charge feed costs to the lot owners whose cattle are contained in the pens. An example of data generated by host computer 42 after comparing the feed delivery data against the feed dispensed data is shown in Table II.

TABLE II

| FEED TRUCK NO. 1 REPORT | | | | | |
|---|---|---|---|---|---|
| Pen | Ration | Ordered | Fed | Diff | Date | Time |
| a101 | 2 | 500 | 505 | 5 | 1/21 | 5:17 PM |
| F106 | 2 | 2000 | 1998 | −2 | 1/21 | 5:19 PM |
| k111 | 2 | 3000 | 3002 | 2 | 1/21 | 5:20 PM |

Having illustrated and described the principles of the invention in a preferred embodiment, it should be apparent to those skilled in the art that the invention can be modified in arrangement and detail without departing from such principles. We claim all modifications coming within the spirit and scope of the following claims.

We claim:

1. A system for assigning feed to feed bunks in a feedlot, comprising:
   computer means programmed for receiving, storing, and displaying feed consumption data for each of a plurality of animal pens in the feedlot;
   data entry means accessible at each of said animal pens for entering feed assignment data for the feed bunk associated with an animal pen and for communicating said assignment data to the computer means; and
   display means accessible at each of said animal pens and communicating with the computer means for displaying the feed consumption data for the animal pen;
   identification means associated with each animal pen for identifying the animal pen;
   the data entry means including means for reading the identification means.

2. The system of claim 1 in which the computer means comprises a host computer for storing the feed consumption data and a portable computer associated with the data entry means and display means for recording the feed assignment data, said portable computer being adapted to transfer said feed assignment data to the host computer and to display the feed consumption data from the host computer.

3. The system of claim 1 in which the computer means further comprises means to update the feed consumption data with the assignment data and to determine from said updated data a feeding route to said animal pens, said route being a list of pens to be displayed successively on the display means as feed is subsequently dispensed at each pen.

4. The system of claim 1 in which the computer means further comprises means to update the feed consumption data with the assignment data and to determine from said updated data a ration quantity for each of said animal pens.

5. The system of claim 1 in which the identification data entry means includes an RF transmitter and the machine comprises an RF receiver.

6. The system of claim 1 in which the identification means comprises a bar code and the data entry means includes a bar code scanner.

7. A system for delivering feed rations to feed bunks in a feedlot, comprising:
   computer means programmed for providing feed delivery data indicating a desired weight of a ration quantity to be delivered to each of a plurality of animal pens for dispensing in an associated feed bunk;
   feed carrying means for delivering feed to each animal, the feed carrying means including a scale for weighing each ration quantity actually dispensed into the associated feed bunk;
   data entry means accessible at each animal pen for receiving the weight of each ration quantity as it is weighed by the scale, said data entry means being adapted to communicate with said computer means as the ration quantity is dispensed;
   the computer means being further programmed to compare the actual weight of the ration quantity against the desired weight for each animal pen and to provide an alarm as the actual weight approaches the desired weight;
   said computer means being programmed to compare an animal pen identified to receive a ration quantity from the feed carrying means against the ration type being delivered to the pen and to provide an alarm if the pen so identified is not one of the plurality of animal pens.

8. The system of claim 7 in which the computer means comprises a host computer for storing the feed delivery data and a portable computer associated with the data entry means for recording said feed dispensed data, said portable computer being adapted to transfer said feed dispensed data to the host computer.

9. The system of claim 7 in which said data entry means includes means for coupling the computer means to the scale for receiving the weight measured by the scale.

10. A system for delivering feed rations to feed bunks in a feedlot, comprising:
    computer means programmed for providing feed delivery data indicating a desired weight of a ration quantity to be delivered to each of a plurality of animal pens for dispensing in an associated feed bunk;
    feed carrying means for delivering feed to each animal, the feed carrying means including a scale for weighing each ration quantity actually dispensed into the associated feed bunk;
    data entry means accessible at each animal pen for receiving the weight of each ration quantity as it is weighed by the scale, said data entry means being adapted to communicate with said computer means as the ration quantity is dispensed;
    the computer means being further programmed to compare the actual weight of the ration quantity against the desired weight for each animal pen and to provide an alarm as the actual weight approaches the desired weight;
    the computer means being programmed to include within the feed delivery data withdrawal data for each drug within a feed ration to be delivered and to check the withdrawal data for the ration against the date that animals are being discharged from the animal pen which is receiving the ration and to provide an alarm if the feed should not be dispensed.

11. The system of claim 10 in which the feed delivery means comprises a motor vehicle and the feed delivery data includes a delivery route for the motor vehicle calculated from the ration quantities to be delivered to the animal pens.

12. A system for delivering feed rations to feed bunks in a feedlot, comprising:
    computer means programmed for providing feed delivery data indicating a desired weight of a ration quantity to be delivered to each of a plurality of animal pens for dispensing in an associated feed bunk;
    feed carrying means for delivering feed to each animal, the feed carrying means including a scale for weighing each ration quantity actually dispensed into the associated feed bunk;
    data entry means accessible at each animal pen for receiving the weight of each ration quantity as it is weighed by the scale, said data entry means being adapted to communicate with said computer means as the ration quantity is dispensed;

the computer means being further programmed to compare the actual weight of the ration quantity against the desired weight for each animal pen and to provide an alarm as the actual weight approaches the desired weight;
identification means associated with each animal pen for identifying the animal pen, and the data entry means including means for reading the identification means.

13. A process for assigning feed to feed bunks in a feedlot, comprising:
   driving to an animal pen having an associated feed bunk for which feed is to be assigned;
   entering pen identification data for the pen in a computer programmed to store data about each pen;
   observing the condition of the feed bunk for making a feed assignment;
   entering feed assignment data for the feed bunk into the computer for recording with the pen identification;
   repeating the above steps until feed has been assigned to each feed bunk; and
   gathering the entered data for determining the feed to be delivered to the animal pens;
the entering of pen identification data comprising reading the pen identification on the animal pen by machine.

14. The process of claim 13 in which gathering the entered data comprises transferring the data to a host computer for updating feed consumption data for the animal pens.

15. The process of claim 13 in which entering assignment data includes entering data on the priority of feeding for the animal pens.

16. The process of claim 13 in which entering pen identification data comprises reading and confirming a pen identification provided as part of a preselected bunk reading route by the computer.

17. A process for delivering feed rations to feed bunks in a feedlot, comprising:
   storing in a computer for selective display feed delivery data for each of a plurality of animal pens in the feedlot, each pen having an associated feed bunk, said data including the type of feed ration for each pen;
   loading a feed truck with a ration quantity for said delivery;
   driving to one of the animal pens for delivering the ration quantity;
   entering in the computer pen identification data;
   checking via the computer the pen identification data against the type of ration to determine if the ration type is to be dispensed to the pen;
   monitoring the ration quantity as it is being dispensed into the feed bunk associated with the pen;
   repeating the above steps for each animal pen; and
   recording for each pen the actual quantities dispensed;
the entering of pen identification data comprising reading the pen identification on the animal pen by machine.

18. The process of claim 17 in which the feed delivery data includes a desired quantity of feed ration to be delivered to each pen, and monitoring the ration quantity comprises comparing via the computer the ration quantity actually dispensed against the desired quantity in the feed delivery data.

19. The process of claim 17 in which the feed delivery data includes a desired quantity of feed ration to be delivered to each pen, the process including recording the desired quantity dispensed for each pen along with the actual quantity dispensed.

20. The process of claim 17 including checking the type of feed ration for a withdrawal date against the date that animal in the pen are being discharged.

21. The process of claim 17 in which entering pen identification data comprises reading and confirming a pen identification provided as part of a preselected feed delivery route by the computer.

22. The process of claim 17 in which monitoring the ration quantity as it is being dispensed includes displaying the target weight for the quantity beforehand and alerting the truck operator as the target weight is approached during the dispensing.

23. The process of claim 17 in which checking the pen identification against the ration type includes alerting the truck operator if the ration type should not be dispensed in the identified pen.

* * * * *